Patented Nov. 4, 1941

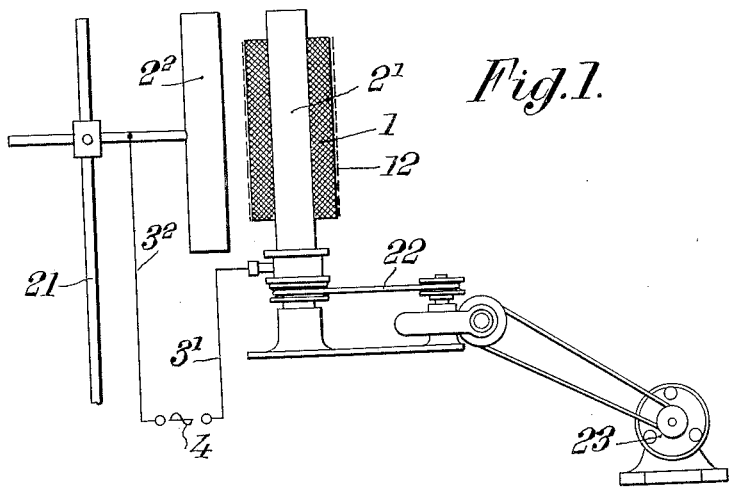
Fig. 1. Fig. 2. Fig. 3. Fig. 4.
Inventors
René Dufour,
Henri Auguste Leduc,
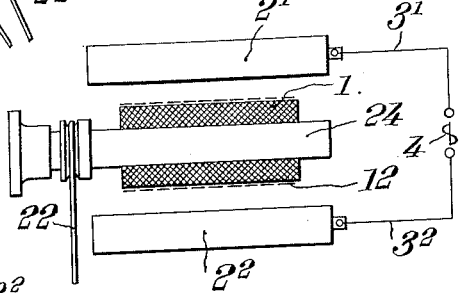
Attorneys

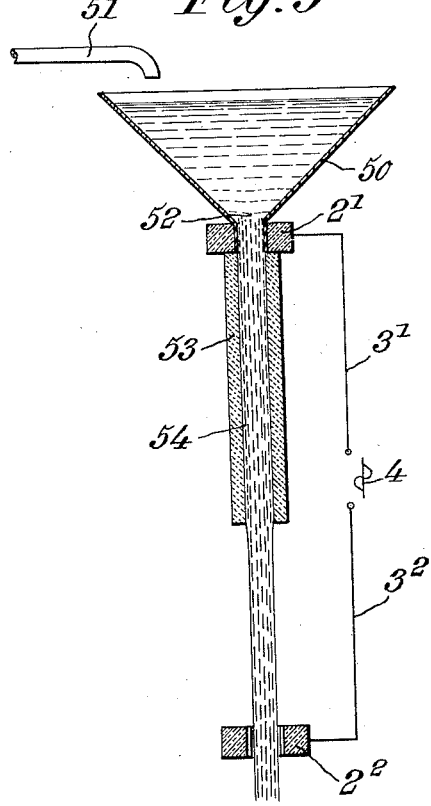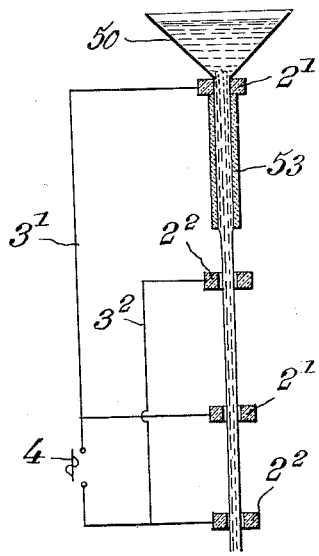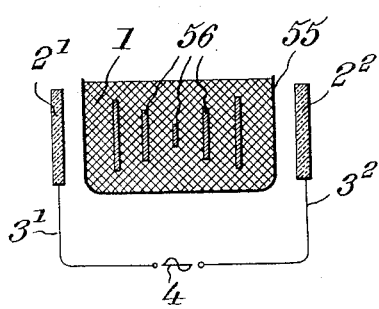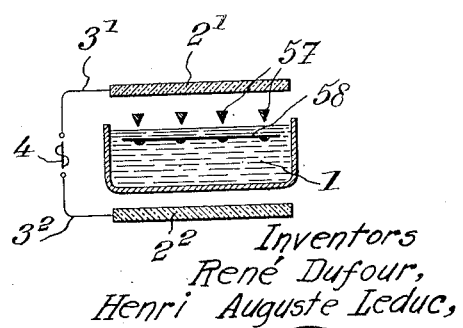

2,261,847

UNITED STATES PATENT OFFICE 2,261,847

METHOD FOR HEATING AND VULCANIZING RUBBER AND SIMILAR MATTER

René Dufour, Paris, and Henri Auguste Leduc, Asnieres, France

Application October 26, 1936, Serial No. 107,710
In Luxemburg October 29, 1935

5 Claims. (Cl. 18—53)

The present invention relates to methods of heating and vulcanizing rubber and similar matter, said method being of the kind of that specified and claimed in our application S. N. 44,974 and which comprises placing the mass to be treated between spaced metallic elements adapted to form the electrodes of an electric condenser and supplying to said elements alternating current, advantageously of relative high frequency.

According to one object of the invention, there is given to the electrodes of the condenser such a configuration that the field of the electric induction, in the course of the thermal treatment, presents concentrations or weakenings in such region where it is desired to increase or diminish the thermal effect, for example by utilising non-parallel electrodes or conical electrodes.

According to another object of the invention, the condenser, between the electrodes of which is interposed the mass to be treated, is located in an enveloping casing in which there is caused to act a pressure or a depression, for example by compressed or rarefied air, steam or any other suitable fluid.

According to another object of the invention the electrodes of the condenser are mounted for relative movement one with respect to the other, the mass to be treated being, for example, made integral with one of said electrodes.

According to another object of the invention, the materials to be treated are made to pass through openings located in conducting members connected respectively to the terminals of a source of alternating current, which is suitable more particularly for the heat treatment of pieces of rubber or similar matter having an indefinite length and a determined transverse section, such on threads or bands formed or covered by coagulated latex or the like.

According to another object of the invention, threads, bands or tissues coated with non-coagulated latex, non-vulcanized rubber or similar matter are made to pass in the neighbourhood of fixed conducting members, the assembly being submitted to the action of a field produced between the electrodes of an electric condenser in such a way as to cause a greater heating and, consequently, a more considerable deposit of the latex or the like in the neighbourhood of the said conducting members.

In the accompanying drawings:

Fig. 1 shows, in diagrammatic section, an arrangement constructed according to an embodiment for carrying the invention into effect.

Figs. 2, 3 and 4 show, diagrammatically, three different variations of this embodiment of the invention.

Figs. 5 and 6 show, both in vertical diagrammatic section, two arrangements constructed respectively and according to two variations of a second embodiment of the invention.

Fig. 7 shows, similarly, an arrangement constructed according to a third embodiment of the invention.

Fig. 8 shows, similarly, an arrangement constructed according to a fourth embodiment of the invention.

As initial materials there can be taken latex, or other rubber-like matter, and there are incorporated therewith the usual ingredients necessary for vulcanisation such as sulphur, plasticisers, accelerators or the like.

After having given to the mass 1 to be treated any desired form, it is introduced between two metallic members $2^1$ and $2^2$ adapted to form the electrodes or systems of electrodes of an electric condenser, these electrodes being single or multiple and being fixed or given a relative movement. The said electrodes are connected by wires $3^1$ and $3^2$ respectively to the terminals of a source of alternating current 4, of relatively high frequency and for example of the order of 1 to 10 millions per second or more.

The assembly formed by the elements 1, $2^1$ and $2^2$ constitutes an actual condenser in which the heating of the mass takes place probably by an effect of viscosity or di-electric hysteresis when a suitable alternating tension is applied to the terminals of the condenser.

If necessary one can influence the degree of heating, in such a way as to increase or diminish the calorific effect in the desired proportions, by incorporating in the mass, by combination or mixture and uniformly or not, substances such as silica, sulphur, graphite, lamp-black, oxides or sulphides, certain resins, protein materials (casein, etc.), among which silica has the property of diminishing the liberation of heat and sulphur or graphite that of increasing this liberation.

There can also be interposed, between the electrodes and the mass 1 to be treated, one or several dielectrics of different nature from that of the said mass and which, by dielectric effect, become heated more or less than this latter to obtain finally a heating effect suitable for the assembly. In the same way there can be adopted for the electrodes a metal which is more or less a conductor of heat or these can be insulated in a suitable manner on the internal and/or external faces to facilitate or prevent losses of heat towards the exterior.

One can also in certain cases give to the electrodes such a configuration that the electric induction field, in the course of heating, presents concentrations, or on the contrary weakenings, in a region where it is desired to increase or diminish the heating effect, for example by utilising electrodes not parallel between themselves, or again electrodes of great curvature giving place to point effect or the like.

The assembly of the apparatus (electrodes and material to be treated) or at least a part (electrodes or material to be treated) of the said assembly can sometimes advantageously be provided in a circuit in which there is caused to exist a high pressure or a depression of air, steam or any other appropriate fluid.

A depression can, for example in the case of a distillation, facilitate the giving off and the recuperation of the volatile products, and in the case of a fabrication of spongy or porous materials, facilitate the swelling of the mass.

A high pressure can on the contrary prevent this swelling if this latter is considered detrimental. It can have again other advantages such as that of facilitating certain chemical reactions taking place with diminution of volume or that of permitting the augmentation of the active electric field without harmful disruptive effect or of preventing a volatilisation or a dissociation.

In our pending application S. N. 44,974, several examples are shown relative to condensers with fixed electrodes. There can, however, as shown on Figs. 1 to 4, be provided a relative movement between the electrodes, and the mass 1, for example a rotation, a translation or a more complex movement, the mass to be treated partaking or not of this movement.

For the example according to Figs. 1 to 4 it has been supposed that it is a question of the vulcanisation of a mass 1 of rubber engaged, in a permanent or temporary manner, on a cylindrical metallic core, the said mass 1 being able to be maintained, in the usual way, by strips 12.

In the case of Fig. 1 the metallic core is utilised as one of the electrodes $2^1$ of a condenser, the other electrode $2^2$ being constituted by a metallic member which is mounted on a fixed support 21 at a distance more or less great from the external face of the mass 1 and to which is given such a shape that it is located at a practically constant separation from the external face of the core and that it extends at least over the whole length of the mass 1. On Fig. 1 the electrode $2^2$ has been constituted by a cylindrical member of which the axis is parallel to that of the electrode $2^1$, it being understood that any other shape, for example that of a portion of a cylinder, would be suitable.

The electrode $2^1$ is driven according to a continuous movement of rotation around its axis by appropriate means, for example a belt transmission 22 actuated by an electric motor 23.

By such an arrangement it is ensured that, in consequence of the rotation of the core, the parts of the rubber mass 1, which pass between the electrodes, are heated uniformly over all their thickness and are then withdrawn from the action of the condenser until they arrive again in the space separating the electrodes. It is to be noted that losses of heat, on the surface of the mass, are negligible particularly when the covering by the strips constitutes a good calorific insulation. Moreover, as shown on Fig. 2, the fixed electrode $2^2$ can be subdivided into several elements, such as $2^a$, regularly distributed around the central electrode $2^1$, these different elements $2^a$ being connected to the same wire $3^2$ terminating in a terminal of the source 4.

Instead of the central electrode $2^1$ being rotatable and the exterior electrode or electrodes being fixed, these latter could be made to turn around the mass 1 and the core $2^1$ which supports it.

For the example according to Fig. 3, the rotary metallic core 24, carrying the mass 1, is not connected to one of the terminals of the source 4. The electrodes $2^1$ and $2^2$ are both constituted like that shown on Fig. 2 and they are located in a fixed position in a single diametric plane of the core 24. In this way the flux is transmitted, by electric induction effect, from one of the electrodes to the core 24 and from this latter to the other electrode by traversing the mass of rubber in two diametrically opposite positions. Equally in this case there can be provided two groups of multiple electrodes similar to the electrodes $2^a$ shown on Fig 3.

For the example according to Fig. 4, one electrode $2^1$ is constituted by the central core and the other by an annular member $2^2$, coaxial with the electrode $2^1$ and more or less separated from the exterior face of the mass 1. The central electrode $2^1$ can be fixed or rotary and the electrode $2^2$ is displaced axially and following an alternating movement with respect to the mass 1, for example by mounting the said electrode on a screw-threaded nut 25 adapted to slide along a threaded rod 26, driven in rotation by a transmission such as 22. A device for reversing the rotation (not shown) intervenes automatically to cause the rod 26 to turn in the opposite direction when the electrode $2^2$ has arrived at the end of its stroke.

For the arrangements according to Figs. 5 and 6 there are taken as initial materials latex, gum or the like in the fluid or non-coagulated state and which can, if necessary, be made sensitive to a heat treatment by adding thereto an appropriate sensitiser or coagulation accelerator.

This initial material is delivered, in the form of a thread, by suitable means such as drawplates or other devices already utilised in the industry engaged in the manufacture of threads of flexible material starting from a more or less fluid mass.

For the example shown on Fig. 5, recourse is had to a hopper 50 of glass or other similar material and this hopper is fed continuously by a conduit 51 in such a way that the level remains practically constant. The orifice 52 of the base of the said hopper is given a form and dimensions which agree with those of the transverse section of the coagulated thread it is desired to obtain.

At the outlet end of the hopper there is provided, concentrically to the orifice 52, a ring or metallic annular member $2^1$, of which the internal opening corresponds substantially to that of the outlet orifice of the hopper. Below the ring $2^1$ there is disposed, coaxially, a tube or sleeve 53 of a non-conducting material, such as quartz, to which is given a length such that the material, after having undergone the heat treatment explained hereafter, leaves the said tube sufficiently or completely coagulated.

Beyond the outlet end of the said tube 53 coaxially, there is provided a second ring or annular member 2² of dimensions equal or not to those of the ring 2¹.

The said rings 2¹ and 2² are connected respectively by wires 3¹ and 3² to the terminals of a source of alternating current 4, preferably at relatively high frequency and for example of the order of 1 to 10 millions per second. In this way these members constitute the electrodes of an electric condenser between which the material to be coagulated flows in a continuous manner and at an appropriate speed to undergo there a heating to the heart itself of the mass by dielectric effect.

Fig. 6 shows a similar arrangement but for which each single electrode 2¹ or 2² is replaced by at least two electrodes connected between themselves as for a condenser with multiple electrodes, the separations between the electrodes being adapted to be equal or different according to the degree of heating which it is desired to obtain for the materials moving between these electrodes.

The degree of heating can be regulated by a suitable choice of the intensity of the electric field or of the speed of advancement of the thread in such a way as to stop the treatment at any one of the stages which it comprises, that is to say coagulation, drying, vulcanisation.

There can be given to the internal transverse section of the tube or sleeve 53 a form, for example circular, square, rectangular or otherwise, and dimensions corresponding to the section it is desired to give to the coagulated piece. If necessary the tube 53 can be constituted of a material, such as glass or Bakelite, which becomes more or less heated in the electric field of the condenser in such a way as thus to effect a supplementary and exterior heating of the mass to be treated.

After coagulation the piece can be dried vulcanised, coated with talc, provided with a textile or other covering or undergo any other usual treatment. It can also after coagulation but before vulcanisation undergo modifications in shape such as the impression of striations, channelling, drawings, obtained for example by passage between two engraved wheels, these wheels being able if necessary to play at the same time the part of electrodes.

The same arrangements could be utilised for the continuous manufacture of bands, carpets or sheets of coagulated latex or of threads or tissues coated, wrapped or impregnated with latex or the like, for example gummed tissues, hospital sheets, dressings or the like. In this case it is sufficient for example to cause the thread, tissue, strip or the like to pass into the openings or slits of suitable dimensions located in the electrodes 2¹ and 2². As the heating of the mass extends from the central part towards the periphery there exists between the said thread and the internal face of the tube or sleeve a thin layer 54 of non-coagulated materials which is favourable to the sliding or to the forward movement of the thread contrary to what is produced for a heating by exterior means.

The heating by condenser effect can equally be utilised for the thermal treatment of natural, regenerated or synthetic rubber with a view to obtaining certain favourable or desired effects.

It is thus that one can, by such a process, heat, soften and plastify a ball of natural gum before making it pass, in the usual way, into a mixing apparatus, which permits of reducing the length of the operation and the expenditure of mechanical energy in an apparatus of this kind.

One can equally utilise the heating by dielectric effect to produce the oxidation by the air of a ball of gum. It is known that gum subdivided and exposed to the air darkens after a certain amount of heating at about 130° C. and that this treatment gives it a permanent high plasticity, which saves a great deal of energy in the course of the operations which these gums undergo afterwards in the mixing apparatus. Now, when the ball is heated directly, which, to make the operations easier, can have been cut into several pieces, by the treatment according to the invention there is obtained the oxidation of the mass by the air occluded between the sheets of gum constituting the ball. One can even proceed by continuous treatment by making the balls unwind between the electrodes. Moreover, there can be immersed in each ball, metallic points, rods or plates to concentrate the heating field in certain places, these metallic elements being then withdrawn from the heated piece.

Another interesting application of the invention is the softening of old rubber which it is proposed to grind to obtain particles. These old rubber parts heated by a passage between the electrodes, soften very quickly, in such a way that the energy necessary for grinding is reduced to a great extent.

The agglomeration of the particles is another application to the treatment of old rubber. It is known that the particles obtained by grinding of old rubber can be agglomerated by heat under pressure, generally in a press with heating plates. Now, according to the present invention, one can proceed to a preheating of the particles which are made to pass between the electrodes and which are then submitted to the action of a non-heating press. The moulding operations are thus rendered more simple, more rapid and easier.

There can also be utilised the process of heating by dielectric effect to distill crude or used rubber or various wastes with a rubber base with a view to recovering the essences and oils which are disengaged therefrom by heating, this distillation or cracking being able to take place under a depression or under pressure, by a continuous or discontinuous treatment and, in particular, in the presence of catalysers and of hydrogen or acetylene to increase the yield of saturated (light) hydrocarbons. To this end there is provided, for example, a distillation apparatus with electrodes in stages or a tunnel with multiple electrodes, particularly for continuous operation.

Also, used rubber can be regenerated by heating, by dielectric effect, in a closed vessel and at temperatures of 200 to 250° C. or lower and during a sufficiently long time (30 to 90 minutes) in the presence or not of appropriate reagents such as strong acids, alkalis, particularly soda, or of de-vulcanisation accelerators like phenyl-hydrazine or certain of its derivatives. There results therefrom among other things a rapidity of the treatment and an economy due to the homogeneity of the heating at the heart of the mass, the heating being obtained in as easy a manner in the partial vacuum as under pressure.

The heating by condenser effect can equally well be applied to rubberised coatings, for example to the layer of rubber, vulcanised or not, covering a printing cylinder to cause a modification or greater drying of the inks. To this end there can be provided, in the neighbourhood of the rotating cylinder, the fixed electrodes (while being of regulatable position) of a condenser supplied by an alternating current, at high frequency. To increase the heating effect, there can be incorporated in the rubber, at least in the neighbourhood of its surface, active particles such as lamp-black or carbon-black. It is to be noted moreover that the layer of ink, applied on the cylinder, is itself submitted to an auto-heating on account of its high percentage of lamp-black or the like.

The process of heating by condenser effect can equally well be utilised for the heating of latex with a view to obtaining its concentration, by evaporation, in the presence of alkaline stabilisers and protective colloids. Up to the present there has been utilised to this end a turning receptacle heated by steam, which gives rise to various disadvantages due to the formation of skins, creams or thickenings in the neighbourhood of the walls of the receptacle.

According to the invention, recourse is had to a fixed receptacle in the form of a prism, having for example a square transverse section. Conducting walls of this receptacle can be made to alternate with insulating walls or a vessel of insulating material is exposed between the electrodes, which in certain cases can dip directly therein and the opposed conducting walls are connected respectively to the terminals of an alternating source in order that they can constitute the electrodes of a condenser. If necessary, there are provided, in the mass of treated latex, conducting sheets or tubes to cause a concentration of the heating field in certain points of the mass. Moreover, air can be drawn into this latter, for example with the aid of the tubes mentioned above, to assure the homogeneity of the mass and its mixing. This drawing-in of air can, moreover, serve to produce spongy materials if the latex is prepared in such a way that the air bubbles are covered with a layer of coagulated latex. In this case the conducting intermediary sheets can be arranged in such a way that they themselves form the spongy lumps or blocks which can then be vulcanised and dried without other manipulation in the same apparatus.

It is understood that such an apparatus can be utilised without the intervention of blowing, to heat a composite latex of which it is desired to effect the vulcanisation, or a natural latex of which it is desired to effect the coagulation by the effect of heat.

It has been indicated above that one can place in contact with the materials to be treated substances which are good conductors of electricity, for example metallic substances, in the form of powder, moulds or ocres or sheets of more or less regular form and this more especially but not exclusively in the case where there is caused to intervene, as supplementary heating means, a heating by induction effect.

It is also possible considerably to increase the heating of the materials to be treated—without the intervention of an auxiliary electromagnetic field—by incorporating in these materials additional substances, generally conductors of electricity. By such substances there must be understood not only metals in solid pieces, wires, sheets, filings, powders or the like, but also conducting pulverulent bodies such as graphites, lamp-blacks, carbon-black, pulverulent metallic sulphides of which the apparent resistance can be very high on account of the imperfect contact between the particles, although each particle is conductive in itself. It is to be noted that these different substances provided alone in an electric field of high frequency do not become sensibly heated, but that an addition, even very slight, of these substances to dielectric materials, that is to say which are not or but little conducting, such as rubber, facilitates or accelerates the heating of the assembly in the same electric field and that all the more as the quantity of additional substances is more considerable.

For the example indicated above, for which there is utilised a mixture of 100 gr. of gum, 5 gr. of zinc oxide, 3 gr. of sulphur and an appropriate quantity of an accelerator, it is ascertained that in locating this mixture in a determined electric field, the temperature of the mass rises by about 15° C. in 5 minutes.

If there is added to the mixture about 20 gr. of zinc sulphide, there is obtained a heating of 30° C. in the same conditions.

200 cubic centimetres of an oil, placed in a determined field, becomes heated by 7° C. in 5 minutes. Additions of 1 gr. and 2 grs. of lamp-black cause a heating of the same oil respectively of 16° C. and 25° C. in the same conditions. An addition of about 3 grs. of lamp-black gives rise to a heating of 50° C. in 3 minutes while permitting of applying a less high power.

Instead of distributing the additional substances in a more or less divided or pulverulent form in the mass to be treated, these substances then being considered to be positively incorporated in this mass, one can accommodate wires, grids, sheets, segments, granules or other conducting pieces and, for example, metallic, in the mass to be treated, these pieces being provided at the places where it is necessary, desirable or advantageous to concentrate the electric field to increase thus more or less localised heatings. According to the nature of the materials treated, these pieces remain incorporated in the mass (rubber, latex, agglomerates) or can be removed after heating.

A heating arrangement of this kind is shown, by way of example, in Fig. 7. The mass 1 to be treated, for example of oil or rubber, is contained in a receptacle or in a mould 55 located between the electrodes $2^1$ and $2^2$ of an electric condenser, these electrodes being connected respectively by the wires $3^1$ and $3^2$ to a source of alternating current 4, preferably at high frequency. Suppose it is desired to heat more strongly or rapidly the central part of the mass 1, there is located in the middle of the receptacle 55 one or several conducting pieces 56, for example ends of concentric tubes, parallel sheets or the like, which are maintained in suitable relative positions by appropriate supports (not shown). The said cylindrical hollow pieces or the segments can have equal or different heights (as seen on Fig. 7).

In the case where it is desired to coagulate latex or the like, which is rendered sensitive to the heat by the addition of appropriate and known sensitizers, a bath of latex can be provided in a field of high frequency formed by the electrodes of a condenser. The field is regulated in such a way that the heating of the latex is insufficient to cause its coagulation. By causing to pass through this bath metallic wires, grids or sheets, a more intense heating is manifested around these metallic pieces and can be such that a deposit of rubber is formed on the said pieces. The amount of the deposit is regulated by the speed at which the pieces are displaced in the latex as well as the characteristics of the electric field and the constitution of the bath.

These localised heating effects can also be utilised for the continuous production of threads and bands of latex, rubberised tissues or the like of which one at least of the external faces presents ribs, beadings or extra thicknesses which extend over the whole of the length of the piece, therefore parallel to the direction of movement of this latter in the latex bath. To this end and as shown on Fig. 8, there is provided in the neighbourhood of the free surface of the bath (above, below or in contact with this surface, metallic elements 57, having advantageously a section of triangular or trapezoidal form with the point directed towards the latex. These elements are supported in such a way that their respective points are presented at the places where it is desired to obtain the extra thicknesses. The tissue 58 or the like advances, in a continuous manner, in the bath and, in consequence of the concentration, in the neighbourhood of each of the elements 57, of the electric field formed between the electrodes $2^1$ and $2^2$ of the condenser, there is obtained a greater heating of the latex and a more intense deposit of the coagulated latex on the tissue 58. On leaving the bath the rubberised tissue presents on at least one of its faces continuous cords or ribs of which the spacing depends on that of the elements 57.

Whatever may be the arrangement adopted, it is designed so that condenser constructed possesses a relatively small surface, and consequently, a relatively small capacity which permits of adopting a source of alternating current of sufficiently high frequency without being limited by the dimensions of the electrodes.

What we claim is:

1. The method of producing substantially uniform vulcanized coatings of rubber or similar materials upon a metallic member which comprises coating said member with rubber, forming a condenser supplied with an alternating current, said member forming one electrode of said condenser, and moving said coated member in the vicinity of another electrode of said condenser until vulcanization is obtained.

2. The method of claim 1, said coated member being rotated centrally of a plurality of encircling electrodes.

3. The method of claim 1, another electrode consisting of a ring shaped element.

4. A method of continuously curing vulcanizable rubber composition on a metallic conductor which comprises continuously passing said conductor coated with said rubber past an electrode surrounding said rubber while imposing high frequency alternating currents between said conductor and said electrode to heat said rubber composition internally to a vulcanizing temperature.

5. The method of producing substantially uniform vulcanized coatings of rubber or similar materials upon a metallic member which comprises forming a condenser supplied with an alternating current, said member coated with unvulcanized rubber forming one electrode of said condenser, and moving said coating member in the vicinity of another electrode of said condenser until vulcanization is obtained.

RENÉ DUFOUR.
HENRI AUGUSTE LEDUC.